United States Patent Office 3,557,099
Patented Jan. 19, 1971

3,557,099
NITROFURYL-OXADIAZOLE DERIVATIVES
Hermann Breuer, Regensburg, Germany, assignor to E. R. Squibb & Sons, Inc., New York, N.Y., a corporation of Delaware
No Drawing. Filed Jan. 24, 1967, Ser. No. 611,266
Claims priority, application Germany, Mar. 14, 1966, 1,670,338; July 22, 1966, 1,670,370
Int. Cl. C07d 85/52
U.S. Cl. 260—240                   13 Claims

ABSTRACT OF THE DISCLOSURE

This invention relates to new, improved antimicrobial agents of the formula (I)

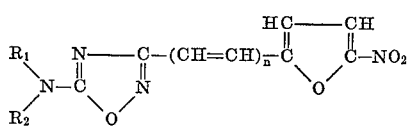

wherein $R_1$ and $R_2$ each represents hydrogen, alkyl, hydroxy-alkyl or acyl or together with the nitrogen atom to which they are attached form a 3 to 6-membered heterocyclic ring which may also contain oxygen or sulfur, and wherein $n$ is 0, 1 or 2.

---

This invention is particularly concerned with new compounds of Formula I wherein $R_1$ and $R_2$ each represents lower alkyl groups of both straight and branched structure such as methyl, ethyl, propyl, isopropyl, butyl, isobutyl, t-butyl, amyl and the like, hydroxy-lower alkyl groups of the same type such as 2-hydroxyethyl, 3-hydroxypropyl and the like, and acyl radicals of the lower fatty acids, e.g., having 2 to 8 carbons, such as acetyl, propionyl, butyryl and the like. In addition, the

grouping represents a 3 to 6-membered heterocyclic, in particular, piperidine, piperazine, morpholine, thiamorpholine or pyrrolidine.

The compounds of this invention show particular advantages over other known nitrofuran derivatives. These compounds are useful as antimicrobial agents to combat animal infections due to bacteria and fungi such as Staphlococci, Escherichia, Klebsiella, Candida and Trichophyton, and particularly effective against infections caused by Trichomonas organisms such as T. vaginalis and T. foetus. They may be used orally in the conventional oral dosage forms in a range of about 10 mg. to 200 mg. per kilogram per day or topically in a cream or ointment vehicle at a concentration of about 0.05 to 2.0%. Especially active are those compounds with free amino groups and particularly those in which there is a single vinyl group ($n=1$).

The products of Formula I may be produced by one of several methods. A compound of the general formula (II)

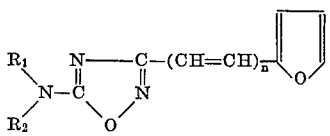

in which $n$, $R_1$ and $R_2$ have the above mentioned meaning, may be nitrated, e.g., with nitric acid. Acylation of the amine group may be simultaneously effected by nitrating in the presence of an acylating agent, e.g., an acid anhydride such as acetic anhydride.

Alternatively, a compound of the formula (III)

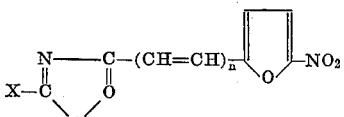

in which $n$ has the same meaning as above and X represents a group which may be replaced by an amine group, e.g., a halogen such as chlorine or a trichloromethyl group, is treated with ammonia or the appropriate amine, e.g., alkylamine, di-alkylamine, piperidine, morpholine, pyrrolidine, thiamorpholine or the like, in an inert organic solvent like ethanol or using the amine compound itself as the medium. If desired, acylation, e.g., with an acid anhydride, may follow.

The following examples are illustrative of the invention. Temperatures are expressed on the centigrade scale.

EXAMPLE 1

3.2 grams of 3 - [2 - (5-nitro-2-furyl)vinyl]-5-trichloromethyl-1,2,4-oxadiazole are added portionwise with stirring to 35 to 40 ml. of liquid ammonia. The product first forms a dark colored solution. Then later a thick crystalline slurry forms. The ammonia is permitted to evaporate and the residue is crystallized from dioxane. Yield: 2 grams of 3-[2-(5-nitro-2-furyl)vinyl]-5-amino-1,2,4-oxadiazole, M.P. 290°, with dec.

EXAMPLE 2

To a mixture formed from 30 ml. of acetic anhydride and 12 ml. of nitric acid ($d=1.52$) at —15° are added portionwise at the same temperature 5 grams of 3-[2-(2-furyl)vinyl] - 5 - acetylamino - 1,2,4-oxadiazole. After the compound has been added, the mixture is stirred for an additional 2 hours, the precipitate is filtered under suction, washed with glacial acetic acid and dried. There are obtained 2 grams of 3-[2-(5-nitro-2-furyl)vinyl])-5-acetylamino-1,2,4-oxadiazole.

EXAMPLE 3

15 grams of 3-(5-nitro-2-furyl)-5-trichloromethyl-1,2,4-oxadiazole are dissolved in 40 ml. of ethanol with warming. The solution is then quickly cooled with vigorous stirring and a fine crystalline suspension results. On cooling to 10°, 15 ml. of ethanolamine are dropped in. A red brown solution results from which the reaction product then crystallizes. The mixture is stirred for one hour, diluted with 100 ml. of water and filtered under suction. The yield is 11.6 grams of 3-(5-nitro-2-furyl)-5-(2-hydroxyethyl)amino-1,2,4-oxadiazole which, after recrystallization from isopropanol, melts at 135–138°.

EXAMPLE 4

15 grams of 3-(5-nitro-2-furyl)-5-trichloromethyl-1,2,4-oxadiazole are dissolved in 50 ml. of ethanol with warming and the solution is then quickly cooled with vigorous stirring. To the fine crystalline slurry are added dropwise, while cooling to 10°, 30 ml. of 40% aqueous dimethylamine solution. The mixture is warmed until a clear solution results and again quickly cooled. There are obtained 7.5 grams of 3 - (5-nitro-2-furyl)-5-dimethylamino-1,2,4-oxadiazole, M.P. 181–182°.

EXAMPLE 5

15 grams of 3 - [2 - (5 - nitro-2-furyl)vinyl]-5-trichloromethyl-1,2,4-oxadiazole are added to 50 ml. of dimethylamine at —20° over a period of 15 minutes and then stirred for an hour at this temperature. The reaction mixture becomes very viscous. The dimethylamine is then evaporated in vacuo and the residue is crystallized from 400 ml. of ethanol. There are obtained 6 grams of 3-[2-(5- nitro - 2 - furyl)vinyl]-5-dimethylamino-1,2,4-oxadiazole, M.P. 186–187°.

EXAMPLE 6

10 grams of 3-[2-(5-nitro-2-furyl)vinyl]-5-trichloromethyl-1,2,4-oxadiazole are added to 25 ml. of pyrrolidine at −20°. The mixture is stirred for 20 minutes at this temperature, 50 ml. of water are added with cooling and the mixture is acidified with acetic acid. There are obtained 8 grams of 3 - [2-(5-nitro-2-furyl)vinyl]-5-(1-pyrrolidinyl)-1,2,4-oxadiazole. After crystallization from acetone, the product melts at 175–176°.

EXAMPLE 7

15 grams of 3-(5-nitro-2-furyl)-5-trichloromethyl-1,2,4-oxadiazole are dissolved with warming in 45 ml. of ethanol and then quickly cooled. To the fine crystalline slurry are added dropwise with stirring at 20° 45 ml. of peperidine. A red brown solution results from which scaly crystals precipitate toward the end of the piperidine addition. The mixture is warmed until a clear solution results and this is again quickly cooled and the crystals are filtered under suction. There are obtained 10.2 grams of 3 - (5-nitro-2-furyl)-5-(1-piperidinyl)-1,2,4-oxadiazole which are recrystallized from 40 ml. of acetone and 10 ml. of petroleum ether, M.P. 143–145°.

What is claimed is:
1. A compound of the formula

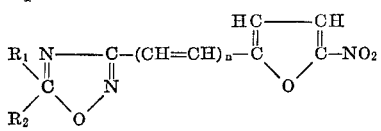

wherein $R_1$ and $R_2$ each is hydrogen, lower alkyl, hydroxy-lower alkyl, acyl or, together with the nitrogen to which they are attached form one of the heterocyclics piperidine, piperazine, morpholine, thiamorpholine or pyrrolidine, and $n$ is 0, 1 or 2.

2. A compound according to claim 1 wherein $R_1$ and $R_2$ are both hydrogen and $n$ is 1.

3. A compound according to claim 1 wherein $R_1$ is lower alkanoyl, $R_2$ is hydrogen and $n$ is 1.

4. A compound according to claim 3 wherein the lower alkanoyl group is acetyl.

5. A compound according to claim 1 wherein $R_1$ is hydroxy-lower alkyl, $R_2$ is hydrogen and $n$ is 0.

6. A compound according to claim 5 wherein the hydroxy-lower alkyl group is hydroxyethyl.

7. A compound according to claim 1 wherein $R_1$ and $R_2$ are both lower alkyl.

8. A compound according to claim 7 wherein the lower alkyl group is methyl.

9. A compound according to claim 1 wherein $R_1$ and $R_2$ form a pyrrolidine group with the nitrogen and $n$ is 1.

10. A compound according to claim 1 wherein $R_1$ and $R_2$ form a piperidine group with the nitrogen and $n$ is 0.

11. A compound according to claim 8 wherein $n$ is 1.

12. A compound according to claim 1 wherein $R_1$ is lower alkyl, $R_2$ is hydrogen and $n$ is 1.

13. A compound according to claim 12 wherein the lower alkyl group is methyl.

References Cited

UNITED STATES PATENTS 3,352,683    11/1967    Schmidt et al. _____ 260—240

FOREIGN PATENTS 1,025,439    4/1966    Great Britain _____ 260—307.7

OTHER REFERENCES

Saikawa et al.: J. Pharm. Soc. Japan, vol. 85, pages 948 to 955 (November 1965).

J. Pharm. Soc. Japan, Table of contents for vol. 85, No. 11 (November 1965), 3 pages added.

JOHN D. RANDOLPH, Primary Examiner

U.S. Cl. X.R.

260—247.5, 268, 294.7, 307; 424—248, 267, 273, 274

PO-1050
(5/69)

UNITED STATES PATENT OFFICE
CERTIFICATE OF CORRECTION

Patent No. 3,557,099         Dated January 19, 1971

Inventor(s) Hermann Breuer

It is certified that error appears in the above-identified patent and that said Letters Patent are hereby corrected as shown below:

The formula in Claim 1 should read as follows:

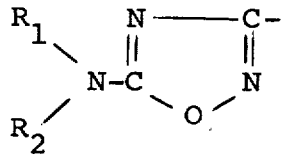

Signed and sealed this 25th day of May 1971.

(SEAL)
Attest:

EDWARD M. FLETCHER, JR.         WILLIAM E. SCHUYLER, JR
Attesting Officer                     Commissioner of Patents